United States Patent [19]
Horsten

[11] Patent Number: 4,975,928
[45] Date of Patent: Dec. 4, 1990

[54] DEVICE FOR DERIVING A CLOCK SIGNAL USING A GATED PHASE-LOCKED LOOP HAVING MEANS FOR SUSPENDING THE GATING AT DEVICE TURN-ON

[75] Inventor: Johannes B. Horsten, Eindhoven, Netherlands

[73] Assignee: U. S. Philips Corporation, New York, N.Y.

[21] Appl. No.: 362,531

[22] Filed: Jun. 7, 1989

[30] Foreign Application Priority Data

Jul. 21, 1988 [NL] Netherlands ............... 8801844

[51] Int. Cl.⁵ .................. H04L 7/08; H04L 7/09
[52] U.S. Cl. .......................... 375/114; 375/120; 358/148
[58] Field of Search ............... 375/106, 111, 113, 114, 375/116, 120; 358/148, 153; 360/36.1, 36.2, 51; 331/4, 10

[56] References Cited

U.S. PATENT DOCUMENTS 4,376,268 3/1983 Moriya et al. ............ 375/120
4,785,468 11/1988 Yoshida ..................... 375/75

FOREIGN PATENT DOCUMENTS 0250274 12/1987 European Pat. Off. .

*Primary Examiner*—Benedict V. Safourek
*Attorney, Agent, or Firm*—Edward W. Goodman

[57] ABSTRACT

A device for deriving a clock signal from an electric signal made up of consecutive signal blocks ($B_i$), each signal block having a first block section ($EBD_i$) containing a first signal and a second block section ($TBD_i$) containing a second signal. The input terminal (1) is coupled to two parallel circuits via a switch (3), one of the parallel circuits including a high-pass filter (8). The circuits have their outputs coupled to the inputs of a phase-locked loop (5) and a code-word detector (6). The output (13) of the code-word detector (6) is coupled to a control signal generator (15). The control signal generator (15) generates control signals which are applied to a control signal input (9) of the switch. During normal operation, the switch (3) defines a time window for the electric signal, so that only the first block sections are applied to the code-word detector (6) and the phase-locked loop (5) to derive the clock signal from the signal information in these first block sections. When the device is switched on, the time window function is disabled. The complete signal is applied to the inputs of the phase-locked loop (5) and the code-word detector (6) via the high-pass filter (8). When the code-word detector (6) has detected a code-word, the timing of the device is in step and changing over to normal gated operation is possible.

2 Claims, 1 Drawing Sheet

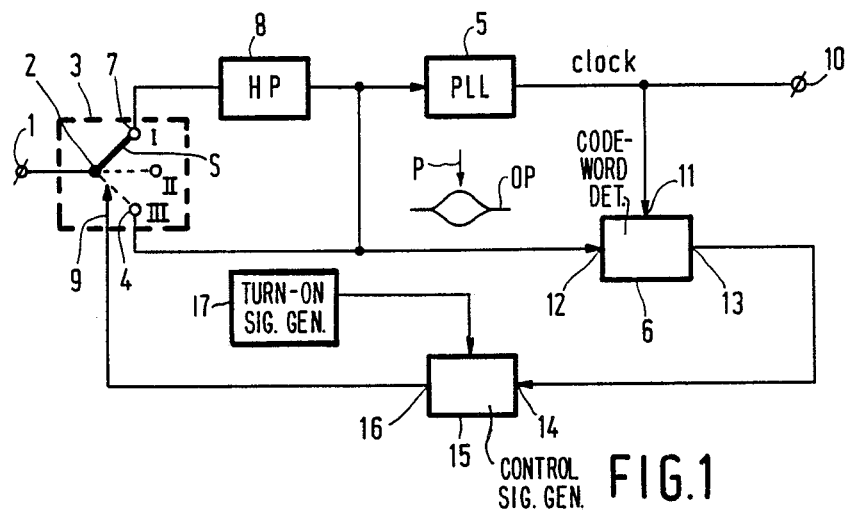
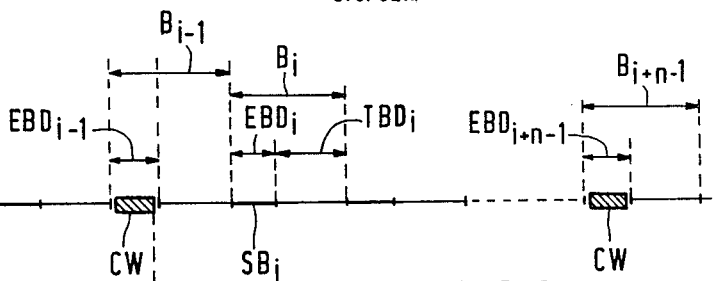
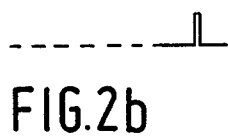
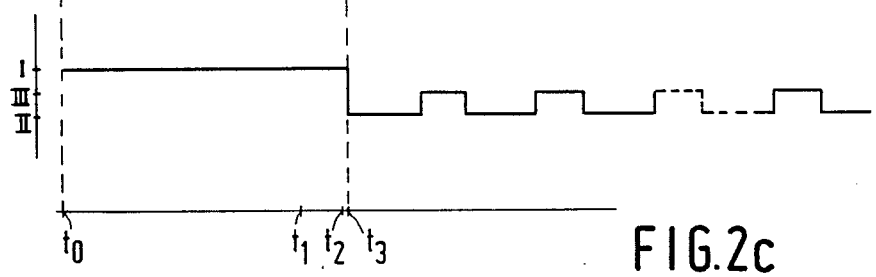

DEVICE FOR DERIVING A CLOCK SIGNAL USING A GATED PHASE-LOCKED LOOP HAVING MEANS FOR SUSPENDING THE GATING AT DEVICE TURN-ON

BACKGROUND OF THE INVENTION

1. Field of the Invention

The invention relates to a device for deriving a clock signal from an electric signal, the electric signal being made up of consecutive signal blocks, a signal block comprising a first block section containing a first signal and a second block section containing a second signal, the first block section of every n-th signal block containing a unique code-word, the device comprising an input terminal for receiving the electric signal, which input terminal is coupled to a first terminal of switching means, which have a second terminal coupled to an input of a phase-locked loop and to an input of a code-word detector which is constructed to detect the unique code-word, the output of the code-word detector being coupled to a control-signal generator, which has an output coupled to a control-signal input of the switching means, the control-signal generator being constructed to generate a control-signal during the time that first block sections are applied to the first terminal of the switching means, and the switching means being constructed to couple the first terminal to the second terminal under the influence of the control-signal. Such a device is employed inter alia in video recorders in order to derive the clock signal from a video signal, for example a MAC signal, read from a magnetic record carrier. However, the device may also be employed in the recording mode of a video recorder when the clock signal is derived from the incoming signal.

The MAC (multiplexed analog components) signals are signals comprising a sequence of lines (signal blocks) with a first block section containing a line-synchronizing signal and a second block section containing the chrominance and luminance information of the video signal. The first block sections further contain additional signals, such as for example the audio signal and other data. The first block sections in the MAC signals generally contain digitally encoded signals. The chrominance and luminance information in the second block sections generally takes the form of an analog signal. One line (signal block) in the MAC signal has a length of 64 µs and the first and the second signal blocks have respective lengths of slightly over 10 µs and slightly less than 54 µs.

The first block section of every n-th signal block, i.e. every 625-th signal block for the MAC signal, contains a unique code-word. This may mean that in addition to the signal already present in the first block section, a unique code-word is included in this block section. Another possibility is that the signal present in this block section takes the form of the unique code-word.

The relevant signal block which includes the unique code-word corresponds to the 625-th and last video line in the MAC video signal which represents exactly one video picture.

The advantages of the MAC signals are: the television picture has a higher resolution, the sound is of a higher quality, and there is (hardly) any crosstalk between chrominance and luminance signal. This last-mentioned advantage is obtained because the chrominance information and the luminance information are stored separately in a second block section.

2. Description of Related Art

The phase-locked loop (PLL) in the known device derives the clock signal from the signal content of the first block sections, which for this purpose are applied to the input of the PLL. To this end the switching means are closed at the instants at which the first block sections are applied to the first terminal, i.e. the terminals 1 and 4 are interconnected, and at other instants the switching means are open. Here the clock signal is derived by means of a "gated PLL". Such a method of deriving the clock signal is known.

SUMMARY OF THE INVENTION

It is an object of the invention to provide a device for deriving a clock signal which is rapidly "in timing" after turning on the video recorder, so that after switching on, the phase-locked loop can rapidly and correctly lock in to the signal content of the first block sections. To this end the device in accordance with the invention is characterized in that the switching means further comprise a third terminal, which third terminal is also coupled to inputs of the phase-locked loop and the code-word detector via a high-pass filter, in that the control-signal generator is operable to generate a second control-signal at the instant at which the device is turned on, in that the switching means are adapted to couple the first terminal to the third terminal under the influence of the second control-signal, and in that the control-signal generator is adapted to terminate the second control-signal after detection of a unique code-word by the code-word detector.

The invention is based on the recognition of the fact that at the instant at which the device is turned on, it takes a comparatively long time for a phase-locked loop of the gated type to lock in. This is because the timing is not correct until a unique code-word has been detected.

Before this time, the time window cannot be defined accurately enough to gate out the information in the first block section. Consequently, the clock signal cannot be derived adjusted, so that detection of a unique code-word in the code-word detector, which (also) requires the clock signal to sample the signal applied to the input, is rather difficult.

If from the instant at which the device is turned on the electric signal is now applied to the phase-locked loop and the code-word detector via the high-pass filter, the problem of adjusting the time window is avoided. The entire signal is now applied to the phase-locked loop and the code-word detector via the high-pass filter.

The high-pass filter produces a bandwidth limitation in the electric signal, which reduces the (adverse effect of) noise. Moreover, a d.c. free signal is now applied to the code-word detector, so that detection of the unique code-word is simplified. It is obvious that the high-pass filter should have a cut-off frequency lower than the bit rate of the unique code-word.

After detection of the unique code-word, the phase-locked loop is in lock and the time window can be opened at the correct instant. This means that now it is possible to change over to the gated PLL function, which ensures that only information in the first block sections is transferred to the PLL and the code-word detector.

BRIEF DESCRIPTION OF THE DRAWING

An embodiment of the invention will now be described in more detail, by way of example, with reference to the accompanying drawing. In the drawing:

FIG. 1 shows an embodiment of the device in accordance with the invention; and

FIG. 2a shows diagrammatically the electric signal from which the clock signal is to be derived.

FIG. 2b shows the detection signal, and

FIG. 2c shows the position of the switching means as a function of time.

DESCRIPTION OF THE PREFERRED EMBODIMENT

FIG. 1 shows the device, comprising an input terminal 1 coupled to the first terminal 2 of the switching means 3, for example in the form of a three-position switch. The switching means 3 comprise a second terminal 4, coupled to inputs of a phase-locked loop 5 and a code-word detector 6. A third terminal 7 of the switching means 3 is coupled to the inputs of the phase-locked loop 5 and the code-word detector 6 via a high-pass filter 8.

Under the influence of control-signals applied to the switching means 3 via the control-signal input 9, the switch S can be set to the upper position, the center position, or the lower position. The output of the phase-locked loop 5 is a clock signal, which is applied to an output terminal 10.

The code-word detector 6 also receives the clock signal via the input 11. This clock signal is required for detection of the code-word. The output 13 of the detector 6 is coupled to an input 14 of a control-signal generator 15. The output 16 of this generator 15 is coupled to the control-signal input 9 of the switching means 3.

The electric signal applied to the input terminal 1 is shown very diagrammatically in FIG. 2a. The signal comprises successive signal blocks, such as the block $B_i$ in FIG. 2a. Each signal block $B_i$ comprises a first block section $EBD_i$ and a second block section $TBD_i$. The first block section $EBD_i$ contains a first signal.

Every n-th signal block, the signal block $B_{i-1}$ in FIG. 2a, contains a unique code-word CW, which is stored in the first block section $EBD_{i-1}$ of the signal block $B_{i-1}$. The unique code-word may be, for example, a digital number comprising a unique combination of "ones" and "zeros". The second block section of a signal block contains a second signal.

If the electric signal, is a MAC signal the signal information in the first block section EBD of a signal block, is digital and generally comprises audio information and a line-synchronizing signal. As already stated, the first block section of the signal block $B_{i-1}$ contains the unique code-word CW. It is assumed that the first block section $EBD_{i-1}$ of the signal block $B_{i-1}$ only contains this unique code-word. The first block sections $EBD_{i+n-1}$, $EBD_{i+2n-1}$, ... etc. also comprise (only) said unique code-word.

In the second block section, the chrominance information and the luminance information of a video line in a video picture are stored separately one after the other.

The operation of the device shown in FIG. 1 will now be explained with reference to FIG. 2, which shows the signal waveforms. The device shown in FIG. 1 may be incorporated in, for example, a video recorder, for generating a clock signal read from the record carrier in the playback mode, in particular from the signal information in the first block sections EBD of the signal read from the record carrier.

The video recorder is turned on at $t=t_0$. From this instant, the signal shown in FIG. 2a is applied to the input terminal 1 of the device. The control-signal generator 15 receives a turn-on signal from a turn-on signal generator 17 and generates a second control-signal for the switching means 3, under the influence of which the switching means are set to the upper position (position I, see FIG. 1 and FIG. 2c).

Thus, the complete signal is applied to the inputs of the phase-locked loop 5 and the code-word detector 6 via the high-pass filter 8. The phase-locked loop 5 then supplies a clock signal. This clock signal will have substantially the desired value but this value will not yet be accurate enough since the loop 5 has not yet locked in correctly to the signal information in the first block sections. This means that the clock instants at which the (digital) signal applied to the input 12 is sampled in the code-word detector 6 will not be timed correctly.

This can be illustrated as follows. When the signal applied to the input 12 of the code-word detector 6 is displayed on an oscilloscope, an eye pattern OP as shown in FIG. 1 will become visible. For the correct detection of the signal it is necessary that the clock instants, also referred to as sampling instants, are timed to appear exactly at the maximum in the eye pattern. This is indicated by means of the arrow P in FIG. 1.

Since the signal is applied to the code-word detector 6 via the high-pass filter 8 the signal will not contain much noise. Moreover the signal is d.c. free. The code-word detector 6 is now capable of detecting the code-word applied at the instant $t=t_1$. Upon detection of the code-word, at the instant $t=t_2$ the detector 6 produces a pulse on its output and applies this pulse to the control-signal generator 15, see FIG. 2b. At this instant the system is "in timing" and gating, i.e. changing over of switching means 3 between the positions II and III under the influence of the control-signal from the generator 15, can start. This can be realized in that the switch S changes over to position II at the instant $t=t_3$, see FIG. 2c. From the instant $t=t_3$ the timing in the control-signal generator 15 ensures that the switching means 3 are alternately set to position II and position III, so that from the instant $t=t_3$ only the first block sections $EBD_i$, $EBD_{i+1}$, ... etc. are transferred to the phase-locked loop 5.

Moreover, the correct timing is maintained because the code-word detector 6 each time detects consecutive code-words in the first block sections $EBD_{i+n-1}$, $EBD_{i+2n-1}$ ... etc., which are also transferred to the code-word detector 6 by the gate formed by the switching means 3 and, if required, the control-signal generator 15 adapts the timing accordingly.

It is obvious that if the code-word is to be applied to the code-word detector via the high-pass filter 8 in the interval between $t=t_0$ and $t=t_3$, this high-pass filter 8 must have a (low) cut-off frequency smaller than the bit rate of the unique code-word. In fact, this also means that the cut-off frequency of the high-pass filter should be lower than the bit rate of the first signal. The phase-locked loop 5 can then already generate a clock signal in this time interval $t_0$, $t_3$.

The first signal may be for example a duobinary signal, which are well known in the art. In addition the derivation of the clock signal of such duobinary signals is well known in the art.

It is to be noted that the invention is not limited to the embodiment shown herein. The invention also relates to those embodiments which differ from the embodiment disclosed herein in respects which are not relevant to the inventive idea. For example, the electric signal need not necessarily be a MAC signal. The electric signal may alternatively be, for example, a MUSE signal.

With the switch S alternately in the position II and III, the code-word detector may further be adapted to count the number of times that no code-word is detected during the occurrence of a time window. When the code-word detector 6 has counted n times that no code-word was detected, it is assumed that the "timing" is lost. The code-word detector 6 now generates a control-signal at its output 13 which is sent to the switch S. Under the influence of this control-signal, the switch S switches over to the position I in order to re-establish timing in the way as previously described.

What is claimed is:

1. A device for deriving a clock signal from an electric signal, the electric signal being made up of consecutive signal blocks, a signal block having a first block section containing a first signal and a second block section containing a second signal, the first block section of every n-th signal block containing a unique code-word, the device comprising an input terminal for receiving the electric signal; switching means having an input, a control signal input and an output, said input terminal being coupled to the input of said switching means; a phase-locked loop having an input coupled to the output of said switching means and an output for supply a clock signal; a code-word detector, for detecting said unique code-word, having a clock signal input coupled to the output of said phase-locked loop, an input also coupled to the output of said switching means, and an output for supplying a detection signal indicating the detection of said unique code-word; and a control signal generator having an input coupled to the output of said code-word detector and an output for suppling a first control signal to the control signal input of said switching means, said control signal generator generating said first control signal, in response to the detection signal from said code-word detector, for causing said switching means to couple the input to the output during the times that the first block sections are applied to the input of the switching means, characterized in that said switching means comprises a further output, said control signal generator comprises a further input, and said device further comprises a high-pass filter having an input coupled to the further output of said switching means and an output also coupled to the inputs of said phase-locked loop and said code-word detector; and turn-on signal generating means coupled to the further input of said control signal generator for causing said generator to generate a second control signal when said device is turned on, said second control signal causing said switching device to couple the input to the further output, said control signal generator terminating said second control signal and generating said first control signal upon receipt of said detection signal from said code-word detector.

2. A device as claimed in claim 1, characterized in that the high-pass filter has a cut-off frequency lower than the bit rate of the unique code-word.

* * * * *